United States Patent
Andrews et al.

(10) Patent No.: US 7,303,830 B2
(45) Date of Patent: Dec. 4, 2007

(54) FUEL CELL

(75) Inventors: Mark J. Andrews, Preston (GB); John E. Lockley, Lancaster (GB); Brian Wilson, Lancashire (GB)

(73) Assignee: Victrex Manufacturing Limited, Thornton Cleveleys, Lancashire (GB)

( * ) Notice: Subject to any disclaimer, the term of this patent is extended or adjusted under 35 U.S.C. 154(b) by 344 days.

(21) Appl. No.: 10/472,227

(22) PCT Filed: Mar. 21, 2002

(86) PCT No.: PCT/GB02/01379

§ 371 (c)(1),
(2), (4) Date: Apr. 6, 2004

(87) PCT Pub. No.: WO02/075835

PCT Pub. Date: Sep. 26, 2002

(65) Prior Publication Data

US 2004/0157102 A1    Aug. 12, 2004

(30) Foreign Application Priority Data

Mar. 21, 2001 (GB) ................... 0107075.4
Sep. 26, 2001 (GB) ................... 0123085.3

(51) Int. Cl.
*H01M 8/00* (2006.01)
(52) U.S. Cl. ............... 429/12; 429/29; 429/33; 429/46
(58) Field of Classification Search ............ 429/12, 429/29, 33, 46
See application file for complete search history.

(56) References Cited

FOREIGN PATENT DOCUMENTS

| DE | 198 47 782 A | 4/2000 |
|---|---|---|
| EP | 0 688 824 A | 12/1995 |
| WO | WO 96 29752 A | 9/1996 |
| WO | WO 97 19480 A | 5/1997 |
| WO | WO 98 22989 A | 5/1998 |
| WO | WO 98 50457 A | 11/1998 |
| WO | WO/00 15691 A | 3/2000 |
| WO | WO0015691 * | 3/2000 |
| WO | WO00170858 * | 3/2000 |
| WO | WO 01 70857 A | 9/2001 |
| WO | WO 01 71839 A | 9/2001 |

OTHER PUBLICATIONS

Kuver, A., et al.; "Comparative study of methanol crossover across electropolymerized and commercial proton exchange membrane electrolytes for the acid direct methanol fuel cell"; Electrochimica Acta, Elsevier Science Publishers, Barking, GB; vol. 43, No. 16-17; May 29, 1998; pp. 2527-2535; XP004134162.

(Continued)

*Primary Examiner*—Patrick Joseph Ryan
*Assistant Examiner*—Jane Rhee
(74) *Attorney, Agent, or Firm*—Nixon & Vanderhye

(57) ABSTRACT

A fuel cell powered by direct fuel, for example a direct methanol fuel cell, includes a polymer electrolyte membrane which includes a semi-crystalline polymer. Preferred semi-crystalline polymers include first repeat units comprising sulphonated aromatic group containing moieties linked by —$SO_2$— and/or —CO— and/or -Q-groups, where Q is O or S and second repeat units which include aromatic group containing moieties linked by —CO— and/or Q groups.

17 Claims, 1 Drawing Sheet

OTHER PUBLICATIONS

Figure 1:
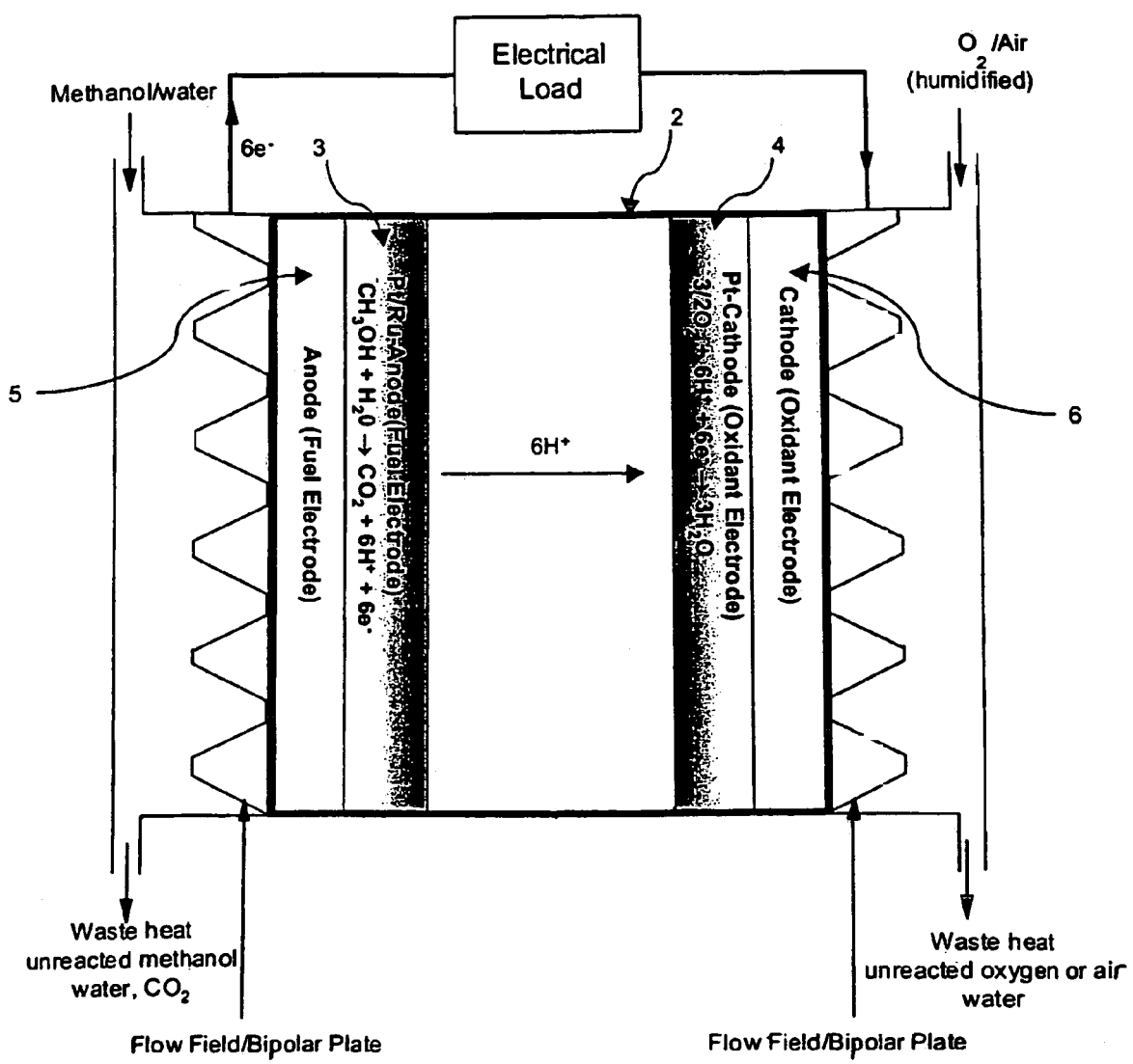

Heinzel, A., et al; "A review of the state-of-the-art of the methanol crossover in direct methanol fuel cells"; Journal of Power Sources; vol. 84, 1999, pp. 70-74; XP002248491.

Wasmus, S., et al; "Methanol oxidation and direct methanol fuel cells: a selective review"; Journal of Electroanalytical Chemistry; vol. 461, 1999, pp. 14-31; XP002248492.

* cited by examiner

FUEL CELL

This application is a PCT International Application No. PCT/GB02/01379 filed Mar. 21, 2002 which designated the U.S.

This invention relates to a fuel cell and particularly, although not exclusively, relates to a fuel cell powered by direct fuel (hereinafter a "FCDF"). The invention extends to a FCDF, a stack of more than one FCDF, suitably in series, a method of manufacturing a FCDF with reduced fuel cross-over, the use of a polymer electrolyte which has at least some crystallinity or is crystallisable for reducing fuel cross-over in FCDFs, novel polymer electrolytes per se and methods of preparing such polymer electrolytes.

FCDFs, for example Direct Methanol Fuel Cells (hereinafter "DMFCs") are known, for example from R M Moore, Proc. Intersoc, Energy Convers. Eng. Conf. 35$^{th}$, Vol.2 1306-1315(2000) (Published Society of Automotive Engineers), and from U.S. Pat. No. 5,795,496 where they are referred to as "methanol oxidising reducing fuel cells". The term FCDF is used herein to refer to a fuel cell wherein a carbon-containing fuel (e.g. methanol) is directly oxidized at an anode, in contrast to indirect fuel cells wherein fuel must be "reformed" and "cleaned" to provide hydrogen rich gas "reformate" for use in the fuel cell system. The term "Direct Methanol Fuel Cell" of DMFC is used to refer to a fuel cell wherein methanol is directly oxidized at an anode.

FIG. 1 of the accompanying schematic drawings illustrates a DMFC, by way of example.

One type of Direct Methanol Fuel Cell (DMFC), shown schematically in FIG. 1 of the accompanying diagrammatic drawings, may comprise a thin sheet 2 of a hydrogen-ion conducting Polymer Electrolyte Membrane (PEM) sandwiched on one side by an anode comprising typically a platinum/ruthenium alloy catalyst 3 and a porous carbon electrode 5 and on the other side by the cathode comprising typically a platinum catalyst 4 and a porous carbon electrode 6. The layers 2, 3, 4, 5, 6 make up a Membrane Electrode Assembly (MEA).

In a DMFC, a fuel (methanol) and water mixture is circulated past the anode and the following electrochemical reaction occurs, releasing electrons and protons:

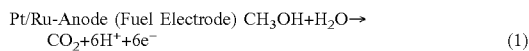

$$\text{Pt/Ru-Anode (Fuel Electrode) } CH_3OH+H_2O \rightarrow CO_2+6H^++6e^- \quad (1)$$

Carbon dioxide produced by the above reaction is withdrawn along with the unreacted fuel and water. The carbon dioxide is separated from the solution in a gas-liquid separator and the fuel and water is recirculated into the cell.

The hydrogen ions or protons migrate through the conducting PEM to the cathode while the electrons are conducted through the external load to the cathode. Simultaneously, an oxidant is introduced at the cathode (oxidant electrode) where the following electrochemical reaction takes place:

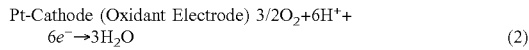

$$\text{Pt-Cathode (Oxidant Electrode) } 3/2O_2+6H^++6e^- \rightarrow 3H_2O \quad (2)$$

The individual electrode reactions described above result in an overall reaction for the exemplary methanol fuel cell given by:

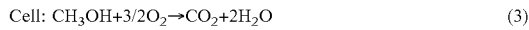

$$\text{Cell: } CH_3OH+3/2O_2 \rightarrow CO_2+2H_2O \quad (3)$$

Thus, electrons and protons are consumed to produce water and heat. Connecting the two electrodes through an external circuit causes an electrical current to flow in the circuit and withdraw electrical power from the cell.

In addition to undergoing electro-oxidation at the anode, the liquid fuel which is dissolved in water permeates through solid polymer electrolyte membrane 2 and combines with oxygen on the surface of the cathode electrocatalyst. This process is described by equation 3 for methanol. This phenomenon is termed "fuel crossover". Fuel crossover lowers the operating potential of the oxygen electrode and results in consumption of fuel without producing useful electrical energy. In general, fuel crossover is a parasitic reaction which lowers efficiency, reduces performance and generates heat in the fuel cell. It is therefore desirable to minimise the rate of fuel crossover.

A known polymer electrolyte membrane material is a perfluorinated proton-exchange material formed of a copolymer of tetrafluoroethylene and perfluorovinylether sulfonic acid, available from Du Pont under the brand name Nafion™. Nafion 115 has been used extensively for proton-conducting membranes.

Nafion, however, raises its own host of problems. For example, it is very expensive and its methanol permeability allows a substantial amount of fuel crossover across the membrane as described above.

It is an object of the present invention to address problems associated with materials used in FCDFS, for example DMFCs.

This invention is based on the discovery that the use of semi-crystalline polymers as polymer electrolyte membranes in FCDFs, for example DMFCs, can significantly reduce fuel cross-over in the cell and, therefore, can improve efficiency.

According to a first aspect of the invention, there is provided a FCDF, for example a DMFC, said FCDF having a polymer electrolyte membrane (PEM) which includes a semi-crystalline polymer.

Surprisingly it has been found that a semi-crystalline polymer, when used as a PEM, allows substantially less fuel cross-over compared to an amorphous polymer of similar type and conductivity. Furthermore, a semi-crystalline polymer has been found to exhibit substantially less fuel cross-over compared to Nafion, a current commercially used material.

The existence and/or extent of crystallinity in a polymer is preferably measured by wide angle X-ray diffraction (also referred to as Wide Angle. X-ray Scattering or WAXS), for example as described by Blundell and Osborn (Polymer 24, 953, 1983). Details are provided in Examples 19 and 20 hereinafter. Alternatively, crystallinity may be assessed by Differential Scanning Calorimetry (DSC).

The level of crystallinity in said semi-crystalline polymer, suitably prepared as described above, may be at least 0.5%, is preferably at least 1%, is more preferably at least 3% and, especially is at least 5%. In some cases, the crystallinity may be greater than 10% or even greater than 12%. The crystallinity may be less than 20% or less than 15%.

Said semi-crystalline polymer preferably includes a repeat unit which suitably includes aromatic (e.g. phenyl) group containing moieties linked by —CO— and/or Q groups, where Q represents —O— or —S— (especially —O—).

Said semi-crystalline polymer may be made up of a number of repeat units, some of which may be crystallisable or have some crystallinity and some of which will be amorphous. For example, repeat units provided with ion-exchange sites, for example sulphonate groups, will tend to be amorphous, as will repeat units which include bulky groups or —SO$_2$—. Repeat units which are crystalline or crystallisable suitably include moieties which can be exchanged with ether units in a polyetherketone crystal lattice. Ketone units and/or —S-units may be exchanged and may, therefore, be components of crystalline or crystallisable units.

A preferred semi-crystalline polymer is one having a moiety of formula

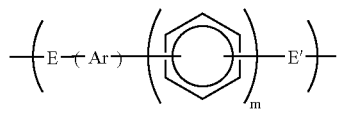

I and/or a moiety of formula

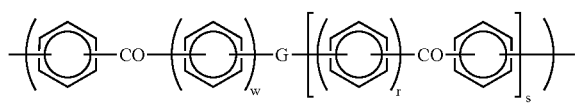

II and/or a moiety of formula

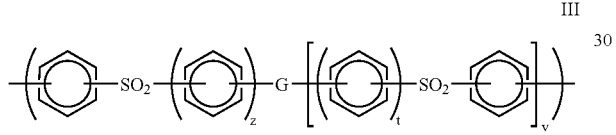

III wherein at least some of the units I, II and/or III are funtionalized to provide ion-exchange sites; wherein the phenyl moieties in units I, II, and III are independently optionally substituted and optionally cross-linked; wherein said material is crystallisable and/or semi-crystalline; and wherein m, r, s, t, v, w and z independently represent zero or a positive integer, E and E' independently represent an oxygen or a sulphur atom or a direct link, G represents an oxygen or sulphur atom, a direct link or a —O-Ph-O— moiety where Ph represents a phenyl group and Ar is selected from one of the following moieties (i)* or (i) to (x) which is bonded via one or more of its phenyl moieties to adjacent moieties (i)*

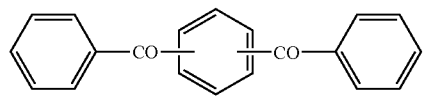

(i)

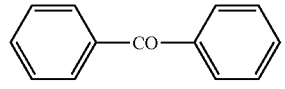

(ii)

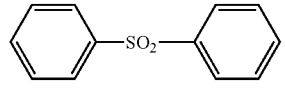

(iii)

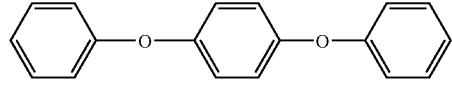

(iv)

(v)

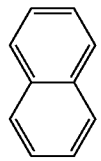

(vi)

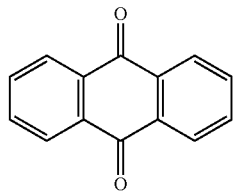

(vii)

(viii)

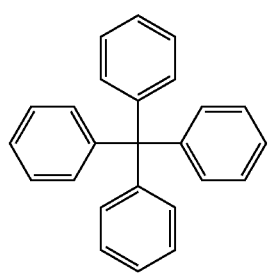

(ix)

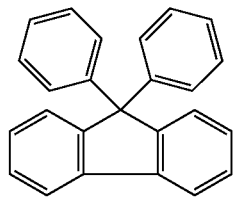

(x)

In (i)*, the middle phenyl may be 1,4- or 1,3-substituted. Suitably, to provide said ion exchange sites, said semi-crystalline polymer is sulphonated, phosphorylated, carboxylated, quaternary-aminoalkylated or chloromethylated, and optionally further modified to yield —$CH_2PO_3H_2$, —$CH_2NR_3^{20+}$ where $R^{20}$ is an alkyl, or —$CH_2NAr_3^{x+}$ where $Ar^x$ is an aromatic (arene), to provide a cation or anion exchange membrane. Further still, the aromatic moiety may contain a hydroxyl group which can be readily elaborated by existing methods to generate —$OSO_3H$ and —$OPO_3H_2$ cationic exchange sites on the polymer. Ion exchange sites of the type stated may be provided as described in WO95/08581.

Preferably, said semi-crystalline polymer is sulphonated. Preferably, the only ion-exchange sites of said first material are sites which are sulphonated.

References to sulphonation include a reference to substitution with a group —$SO_3M$ wherein M stands for one or more elements selected with due consideration to ionic valencies from the following group: H, $NR_4^{y+}$, in which $R^y$ stands for H, $C_1$-$C_4$ alkyl, or an alkali or alkaline earth metal or a metal of sub-group 8, preferably H, $NR_4^+$, Na, K, Ca, Mg, Fe, and Pt. Preferably M represents H. Sulphonation of the type stated may be provided as described in WO96/29360.

Unless otherwise stated in this specification, a phenyl moiety may have 1,4- or 1,3-, especially 1,4-, linkages to moieties to which it is bonded.

Said semi-crystalline polymer may include more than one different type of repeat unit of formula I; more than one different type of repeat unit of formula II; and more than one different type of repeat unit of formula III.

Said moieties I, II and III are suitably repeat units. In the polymer, units I, II and/or III are suitably bonded to one another—that is, with no other atoms or groups being bonded between units I, II, and III.

Where the phenyl moieties in units I, II or III are optionally substituted, they may be optionally substituted by one or more halogen, especially fluorine and chlorine, atoms or alkyl, cycloalkyl or phenyl groups. Preferred alkyl groups are $C_{1-10}$, especially $C_{1-4}$, alkyl groups. Preferred cycloalkyl groups include cyclohexyl and multicyclic groups, for example adamantyl. In some cases, the optional substituents may be used in the cross-linking of the polymer. For example, hydrocarbon optional substituents may be functionalised, for example sulphonated, to allow a cross-linking reaction to take place. Preferably, said phenyl moieties are unsubstituted.

Another group of optional substituents of the phenyl moieties in units I, II or III include alkyls, halogens, $C_yF_{2y+1}$ where y is an integer greater than zero, O—$R^q$ (where $R^q$ is selected from the group consisting of alkyls, perfluoralkyls and aryls), $CF=CF_2$, CN, $NO_2$ and OH. Trifluormethylated phenyl moieties may be preferred in some circumstances.

Said semi-crystalline polymer is preferably not cross-linked. More preferably, ion-exchange sites, e.g. sulphonate groups, throughout the polymer are preferably not cross-linked. Thus, —$SO_3H$ ion-exchange sites on said polymer are preferably free throughout.

Where w and/or z is/are greater than zero, the respective phenylene moieties may independently have 1,4- or 1,3-linkages to the other moieties in the repeat units of formulae II and/or III. Preferably, said phenylene moieties have 1,4-linkages.

Preferably, the polymeric chain of the semi-crystalline polymer does not include a —S— moiety. Preferably, G represents a direct link.

Suitably, "a" represents the mole % of units of formula I in said polymer, suitably wherein each unit I is the same; "b" represents the mole % of units of formula II in said polymer, suitably wherein each unit II is the same; and "c" represents the mole % of units of formula III in said polymer, suitably wherein each unit III is the same. Preferably, a is in the range 45-100, more preferably in the range 45-55, especially in the range 48-52. Preferably, the sum of b and c is in the range 0-55, more preferably in the range 45-55, especially in the range 48-52. Preferably, the ratio of a to the sum of b and c is in the range 0.9 to 1.1 and, more preferably, is about 1. Suitably, the sum of a, b and c is at least 90, preferably at least 95, more preferably at least 99, especially about 100. Preferably, said polymer consists essentially of moieties I, II and/or III.

Said polymer may be a homopolymer having a repeat unit of general formula

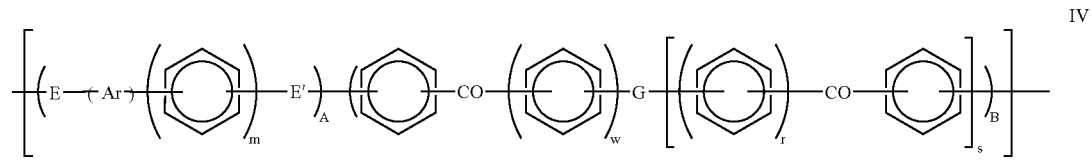

IV or a homopolymer having a repeat unit of general formula

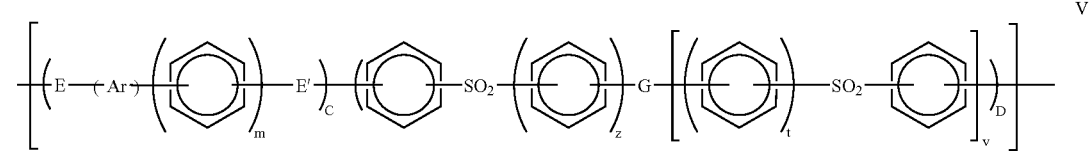

V or a random or block copolymer of at least two different units of IV and/or V wherein A, B, C and D independently represent 0 or 1 and E, E', G, Ar, m, r, s, t, v, w and z are as described in any statement herein.

As an alternative to a polymer comprising units IV and/or V discussed above, said semi-crystalline polymer may be a homopolymer having a repeat unit of general formula

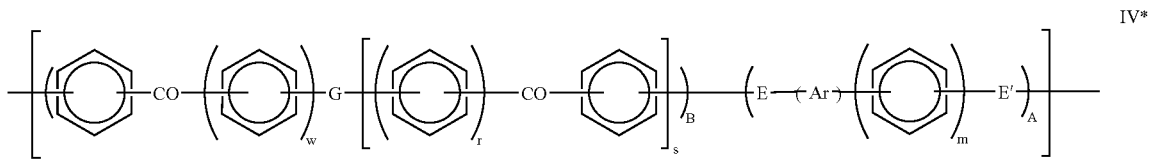

or a homopolymer having a repeat unit of general formula

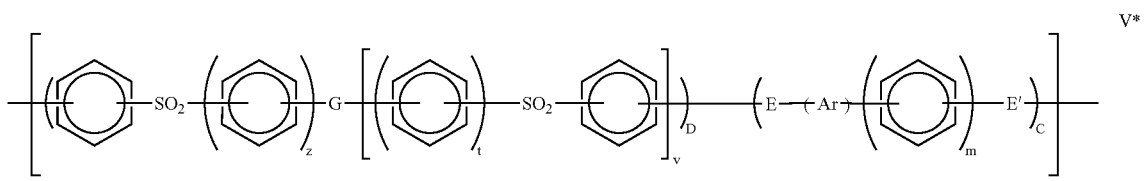

or a random or block copolymer of at least two different units of IV* and/or V*, wherein A, B, C, and D independently represent 0 or 1 and E, E', G, Ar, m, r, s, t, v, w and z are as described in any statement herein.

Preferably, m is in the range 0-3, more preferably 0-2, especially 0-1. Preferably, r is in the range 0-3, more preferably 0-2, especially 0-1. Preferably t is in the range 0-3, more preferably 0-2, especially 0-1. Preferably, s is 0 or 1. Preferably v is 0 or 1. Preferably, w is 0 or 1. Preferably z is 0 or 1.

Preferably Ar is selected from the following moieties (xi)* and (xi) to (xxi):

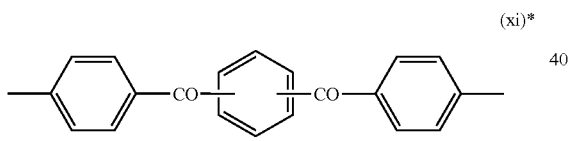

(xi)*

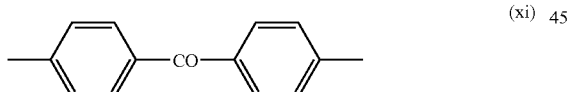

(xi)

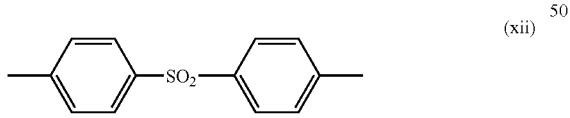

(xii)

(xiii)

(xiv)

-continued

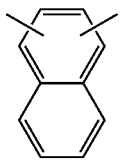

(xv)

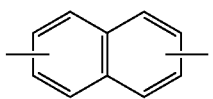

(xvi)

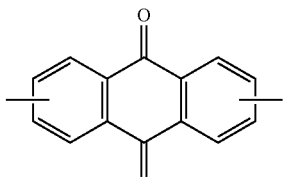

(xvii)

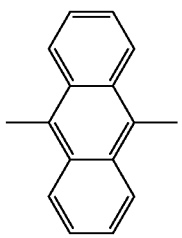

(xviii)

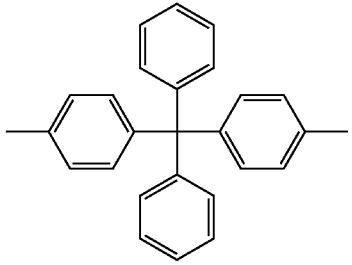

(xix)

-continued

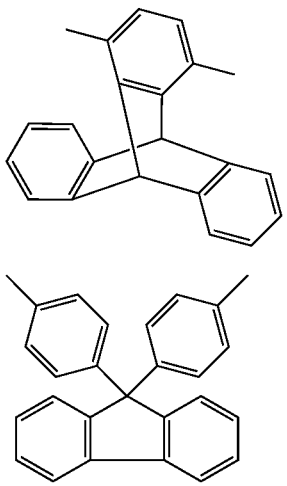

(xxi)

(xx)

In (xi)*, the middle phenyl may be 1,4- or 1,3-substituted.

Preferably, (xv) is selected from a 1,2-, 1,3-, or a 1,5-moiety; (xvi) is selected from a 1,6-, 2,3-, 2,6- or a 2,7-moiety; and (xvii) is selected from a 1,2-, 1,4-, 1,5-, 1,8- or a 2,6-moiety.

One preferred class of semi-crystalline polymers may include at least some ketone moieties in the polymeric chain. Thus, in this case, suitably, a polymer of the first aspect includes moieties of formula I and/or II.

One preferred class of semi-crystalline polymers does not include any moieties of formula III, but suitably only includes moieties of formulae I and/or II. Where said polymer is a homopolymer or random or block copolymer as described, said homopolymer or copolymer suitably includes a repeat unit of general formula IV. Such a polymer may, in some embodiments, not include any repeat unit of general formula V.

Suitable moieties Ar are moieties (i)*, (i), (ii), (iv) and (v) and, of these, moieties (i)*, (i), (ii) and (iv) are preferred. Preferred moieties Ar are moieties (xi)*, (xi), (xii), (xiv), (xv) and (xvi) and, of these, moieties (xi)*, (xi), (xii) and (xiv) are especially preferred. Another preferred moiety is moiety (v), especially, moiety (xvi). In relation, in particular to the alternative semi-crystalline polymers comprising units IV* and/or V*, preferred Ar moieties are (v) and, especially, (xvi).

Preferred semi-crystalline polymers include an electron-rich, relatively non-deactivated, easily sulphonatable unit, for example a multi-phenylene moiety or a fused-rings aromatic moiety, such as naphthalene. Such an easy to sulphonate unit may be sulphonated under relatively mild conditions to introduce two sulphonate groups per unit. Thus, preferred polymers may have at least $10\pi$ electrons in a delocalized aromatic moiety. The number of $\pi$ electrons may be 12 or less. Preferred polymers include a biphenylene moiety. Other preferred polymers include a naphthalene moiety. Preferred polymers include said electron rich, non-deactivated, easily sulphonatable unit bonded to two oxygen atoms. Especially preferred polymers include a —O-biphenylene-O— moiety. Other especially preferred polymers include a —O-naphthalene-O— moiety.

Preferred semi-crystalline polymers include a first type of moiety which is relatively difficult to sulphonate and a second type of moiety which is relatively easy to sulphonate. For example, said second moiety may be sulphonatable using the relatively mild method described in Example 4 hereinafter, whereas the first moiety may be substantially non-sulphonatable in such a method. The use of the method of Example 4 may be advantageous over currently used methods which use oleum. A preferred second said moiety includes a moiety —$Ph_n$- wherein n is an integer of at least 2. Said moiety is preferably bound to at least one ether oxygen. Especially preferred is the case wherein said moiety is —O-$Ph_n$-O— where said ether groups are para to the Ph-Ph bond.

Preferred semi-crystalline polymers are copolymers comprising, preferably consisting essentially of, a first repeat unit which is selected from the following:

(a) a unit of formula IV wherein E and E' represent oxygen atoms, G represents a direct link, Ar represents a moiety of structure (iv), m and s represent zero, w represents 1 and A and B represent 1;

(b) a unit of formula IV wherein E represents an oxygen atom, E' represents a direct link, Ar represents a moiety of structure (i), m represents zero, A represents 1, B represents zero;

(c) a unit of formula V wherein E and E' represent oxygen atoms, G represents a direct link, Ar represents a moiety of structure (iv), m and v represent zero, z represents 1 and C and D represent 1;

(d) a unit of formula V wherein E represents an oxygen atom, E' represents a direct link, Ar represents a moiety of structure (ii), m represents 0, C represents 1, D represents 0; or (e) a unit of formula V wherein E and E' represents an oxygen atom, Ar represents a structure (i), m represents 0, C represents 1, Z represents 1, G represents a direct link, v represents 0 and D represents 1;

(aa) a unit of formula IV wherein E represents an oxygen atom E' represents a direct link, Ar represents a structure (i)*, m represents 0, A represents 1, B represents 0;

(bb) a unit of formula IV wherein E and E' represent oxygen atoms, Ar represents a structure (iv), m and w represent 0, G represents a direct link, s and r represent 1, A and B represent 1;

(cc) a unit of formula IV wherein E and E' represent oxygen atoms, Ar represents a structure (i), m and w represent 0, G represents a direct link, s and r represent 1, A and B represent 1;

and a second repeat unit which is selected from the following:

(f) a unit of formula IV wherein E and E' represent oxygen atoms, G represents a direct link, Ar represents a moiety of structure (iv), m represents 1, w represents 1, s represents zero, A and B represent 1;

(g) a unit of formula IV wherein E represents an oxygen atom, E' is a direct link, G represents a direct link, Ar represents a moiety of structure (iv), m and s represent zero, w represent 1, A and B represent 1;

(h) a unit of formula V wherein E and E' represent oxygen atoms, G represents a direct link, Ar represents a moiety of structure (iv), m represents 1, z represents 1, v represents 0, C and D represent 1; and (i) a unit of formula V wherein E represents an oxygen atom, E' represents a direct link, G represents a direct link, Ar represents a moiety of structure (iv), m and v represent zero, z represents 1, C and D represent 1;

(j) a unit of formula IV wherein E and E' represent oxygen atoms, G represents a direct link, Ar represents a moiety of structure (v), m represents 0, w represents 1, s represents 0, A and B represent 1;

(k) a unit of formula V wherein E and E' represent oxygen atoms, G represents a direct link, Ar represents a moiety of structure (v), m represents 0, z represents 1, v represents 0, C and D represent 1.

Preferred semi-crystalline polymers for some situations may comprise first units selected from (a), (b), (c) and (e) and second units selected from (f), (g), (h) or (i). A polymer comprising units (d) and (h) may also be preferred. In some situations, first units may be selected from (aa), (bb) and (cc) and second units may be selected from (f), (g), (h) or (i).

More preferred semi-crystalline polymers are copolymers having a first repeat unit selected from those described above, especially repeat units (b), (d) or (e) in combination with a second repeat unit selected from units (f) or (h). Other particularly preferred polymers are copolymers having a first repeat unit selected from (aa) and (bb) in combination with a second repeat unit selected from (f) or (h).

In some situations, a difficult to sulphonate unit may include at least one relatively strongly electron-withdrawing group (e.g. —CO— or —$SO_2$— group) bonded to a phenyl group. Such a unit will be more difficult to sulphonate compared to, for example, a unit having a phenyl group not bonded to such a strongly electron-withdrawing group. Thus, in this case, a copolymer comprising a unit (a) or (c) in combination with difficult to sulphonate units as described may be prepared. Preferred copolymers of this type may comprise first (difficult to sulphonate) repeat unit(s) of formula (b) and/or (d) together with second relatively easy to sulphonate) unit(s) of formula (a) and/or (c). Especially preferred copolymers comprise, preferably consist essentially of a first (difficult to sulphonate) repeat unit of formula (b) or (d) together with a second (relatively easy to sulphonate) unit of formula (a) or (c).

Preferred first materials having repeat unit(s) of formulae IV* and V* may include: a unit of formula IV* wherein Ar represents a moiety of structure (v), E represents a direct link, E' represents an oxygen atom, G represents a direct link, w, s and m represent 0, A and B represent 1; and/or a repeat unit of formula V* wherein Ar represents a moiety of structure (v), E represents a direct link, E' represents an oxygen atom, G represents a direct link, z, v and m represent 0, C and D represent 1.

Said first materials having repeat units IV* and V* may include any of repeat units (a) to (i) (and/or units (aa), (bb) and (cc)) described above.

In some situations, semi-crystalline polymers which include at least one repeat unit of formula IV or formula IV* may be preferred.

Copolymers may be prepared having one or more first repeat units and one or more of said second repeat units.

Where said first material is a copolymer as described, the mole % of co-monomer units, for example said first and second repeat units described above, may be varied to vary the solubility of the polymer in solvents, for example in organic solvents which may be used in the preparation of films and/or membranes from the polymers and/or in other solvents, especially water. Also, the mole % of co-monomer units may be varied to vary the level of crystallinity and/or crystallisability. For homopolymers, the level of crystallinity and/or crystallisability may be determined by the level of functionalisation with ion-exchange sites.

Thus, if, for example, polyetherketone or polyetheretherketone are highly sulphonated (to provide high conductivity or high solubility in solvents), then the polymers will have no or low crystallinity. However, if the polymers are less highly sulphonated, the polymers may be semi-crystalline and, therefore, exhibit the advantageous properties described herein when used in DMFCs.

Preferred semi-crystalline polymers have a solubility of at least 10% w/v, preferably a solubility in the range 10 to 30% w/v in a polar aprotic solvent, for example NMP, DMSO or DMF. Preferred polymers are substantially insoluble in boiling water.

First units of the type described above (with the exception of units (a) and (c) in the situation described above) may be relatively difficult to sulphonate, whereas second units of the type described may be easier to sulphonate.

Where a phenyl moiety is sulphonated, it may only be mono-sulphonated. However, in some situations it may be possible to effect bi- or multi-sulphonation.

In general terms, where a said semi-crystalline polymer includes a —O-phenyl-O— moiety, up to 100 mole % of the phenyl moieties may be sulphonated. Where a said first material includes a —O-biphenylene-O— moiety, up to 100 mole % of the phenyl moieties may be sulphonated. It is believed to be possible to sulphonate relatively easily —O-(phenyl)$_n$-O— moieties wherein n is an integer, suitably 1-3, at up to 100 mole %. Moieties of formula —O-(phenyl)$_n$—CO— or —O-(phenyl)$_n$-$SO_2$— may also be sulphonated at up to 100 mole % but more vigorous conditions may be required. Moieties of formulae —CO—(phenyl)$_n$-CO— and —$SO_2$—(phenyl)$_n$—$SO_2$— are more difficult to sulphonate and may be sulphonated to a level less than 100 mole % or not at all under some sulphonation conditions.

The glass transition temperature ($T_g$) of said first material may be at least 144° C., suitably at least 150° C., preferably at least 154° C., more preferably at least 160° C., especially at least 164° C. In some cases, the Tg may be at least 170° C., or at least 190° C. or greater than 250° C. or even 300° C.

Said semi-crystalline polymer may have an inherent viscosity (IV) of at least 0.1, suitably at least 0.3, preferably at least 0.4, more preferably at least 0.6, especially at least 0.7 (which corresponds to a reduced viscosity (RV) of least 0.8) wherein RV is measured at 25° C. on a solution of the polymer in concentrated sulphuric acid of density 1.84 gcm$^{-3}$, said solution containing 1 g of polymer per 1000 cm$^{-3}$ of solution. IV is measured at 25° C. on a solution of polymer in concentrated sulphuric acid of density 1.84 gcm$^3$, said solution containing 0.1 g of polymer per 100 cm$^3$ of solution.

The measurements of both RV and IV both suitably employ a viscometer having a solvent flow time of approximately 2 minutes.

The main peak of the melting endotherm (Tm) for said semi-crystalline polymer may be at least 300° C.

Said semi-crystalline polymer may include a crystalline or crystallisable unit which is of general formula IV or IV* as described above, provided said unit is crystallisable. Suitably, to be crystallisable, said unit does not include any Ar group of formula (ii), (viii), (ix) or (x). More preferably, it may also not include an Ar group of formula (v), (vi) or (vii). Preferred Ar groups consist of one or more phenyl groups in combination with one or more carbonyl and/or ether groups.

In one embodiment, said semi-crystalline polymer is a copolymer comprising:
a first unit which includes an ion-exchange site;
a second crystalline unit; and, optionally,
a third unit which is amorphous.

Suitably, "A*" represents the mole % of said first unit in said copolymer; "B*" represents the mole % of said second unit; and "C*" represents the mole % of said third unit.

Suitably, A* is at least 15, preferably at least 20, more preferably at least 25, especially at least 30. It may be less than 70, preferably less than 60, more preferably less than 50. Preferably, A* is in the range 25-60.

B* may be at least 5. Suitably, B* is at least 15, preferably at least 25, more preferably at least 30, especially at least 35. It may be less than 70, preferably less than 60, more preferably less than 55. Preferably, B* is in the range 5-70.

Suitably, C* is at least 5, preferably at least 7.5, preferably at least 10, especially at least 12.5. In some cases C* may be at least 25. C* may be less than 70, preferably less than 60, more preferably less than 55. In other cases, C* may be less than 30, preferably less than 25, more preferably less than 20, especially 15 or less. Preferably, C* is in the range 5 to 70.

Said first unit is preferably a repeat unit which suitably includes aromatic group containing moieties linked by —$SO_2$— and/or —CO— and/or -Q-groups, where Q is O or S. Because said first unit includes ion-exchange sites, for example, sulphonate groups, it may not be crystalline, but will be amorphous.

Said second unit is preferably a repeat unit which suitably includes aromatic group containing moieties linked by —CO— and/or -Q-groups, where Q is as described above. The second unit preferably does not include —$SO_2$— groups since such would tend to render the unit amorphous.

Said third unit is preferably a repeat unit which suitably includes aromatic group containing moieties linked by —$SO_2$— and/or —CO— and/or -Q-groups, where Q is as described above provided, however, that said third unit suitably includes a means to render it amorphous (hereinafter said "amorphous means") and/or not crystallisable with polyarylether ketones or polyarylthioether ketones and/or not crystallisable with the second unit described above.

Said third unit may comprise a fourth unit which is of formula -Q-Z-Q- wherein Z represents said aromatic group containing moiety, wherein said fourth unit is not symmetrical about an imaginary line which passes through the two -Q-moieties provided, however, that said fourth unit is not dihydroxybenzophenone substituted by groups Q at the 4- and 4'-positions (since such a benzophenone acts in the manner of a symmetrical moiety by virtue of the carbonyl group being substantially similar to an ether group thereby allowing the carbonyl group to be interchanged with an ether group in a polyaryletherketone crystal lattice). Said third unit, for example moiety Z, may include a bulky group.

Said semi-crystalline copolymer may include:
a first unit of formula IV, V, IV* or V* as described above, wherein said first unit is functionalised to provide ion-exchange sites.
a second crystalline unit which is of general formula IV or IV* as described above, provided said unit is crystallisable. Suitably, to be crystallisable, said second unit does not include any Ar group of formula (ii), (viii), (ix) or (x). More preferably, it may also not include an Ar group of formula (v), (vi) or (vii). Preferred Ar groups consist of one or more phenyl groups in combination with one or more carbonyl and/or ether groups.
a third unit which is of general formula IV, IV*, V or V*, provided, however, that said unit includes at least some moieties whose shape and/or conformation is/are incompatible with the crystalline conformation of said second crystalline unit so that said third unit is amorphous. Preferably, said third unit includes an —$SO_2$- moiety; a bulky group or a moiety which is not symmetrical as described above.

Preferred first units may be -ether-phenyl-ketone-phenyl, -ether-phenyl-ketone-phenyl-ether-phenyl-ketone-phenyl-ketone-phenyl, -ether-biphenyl-ether-phenyl-ketone-phenyl, ether-phenyl-ether-phenyl-ketone-phenyl, ether-naphthalene-ether-phenyl-ketone-phenyl), ether-phenyl-ether-phenyl-ketone-phenyl-ketone-phenyl, -ether-dipheny-ether-phenyl-sulphone-phenyl- and -ether-phenyl-ether-phenyl-sulphone-phenyl, suitably functionalised with ion-exchange sites. Another preferred first unit is ether-phenyl-sulphone-phenyl. Preferred second units may be ether-phenyl-ketone-phenyl-ketone-phenyl-, ether-phenyl-ether-phenyl-ketone-phenyl-ketone-phenyl-, ether-phenyl-ether-phenyl-ketone-phenyl-, ether-phenyl-ketone-phenyl-, ether-phenyl-ketone-phenyl-ether-phenyl-ketone-phenyl-ketone-phenyl and ether-biphenyl-ether-phenyl-ketone-phenyl-. Preferred third units may be ether-phenyl-sulphone-phenyl and ether-phenyl-ether-phenyl-sulphone-phenyl. Another preferred third unit may be a -1,3-dioxy-4-(phenylcarbonyl) phenyl moiety derived from 2,4-DHB as herein defined.

In said copolymer, the mole % of co-monomer units, for example said first, second and third repeat units described above, may be varied to vary the solubility of the polymer in solvents, for example in solvents which may be used in the preparation of films and/or membranes from the polymers and/or in other solvents, especially water.

Preferred polymers suitably have a solubility of at least 4% w/w in a polar aprotic solvent, for example NMP, DMSO or DMF. Preferred polymers are substantially insoluble in boiling water.

The semi-crystalline polymer preferably includes less than 10%, more preferably less than 5%, especially less than 1% of cross-linked —$SO_3H$ groups i.e. —$SO_2$— groups formed by cross-linking two —$SO_3H$ groups. Preferably, the semi-crystalline polymer includes no cross-linked —$SO_3H$ groups and no cross-linking in the polymer at all.

Said semi-crystalline polymer could be a component of a blend of polymers—that is, the PEM may comprise a blend of polymers. In such a blend, said semi-crystalline polymer suitably comprises at least 50 wt %, preferably at least 80 wt %, more preferably at least 95 wt %. Preferably, said semi-crystalline polymer is not a component of an acid-base blend. Preferably, said semi-crystalline polymer is not blended with a nitrogen-containing basic polymer. Preferably, said semi-crystalline copolymer is not a component of a blend.

Said semi-crystalline polymer could be a component of a composite membrane in conjunction with a support material which may be non-conducting as described in PCT/GB00/03449 or conducting as described in GB0031209.0.

Said PEM may have a dimension in a first direction of at least 1 cm. The dimension of the PEM in a second direction, perpendicular to the first direction, may also be at least 1 cm. Where the PEM is circular, the diameter may be at least 1 cm. In some cases, for example for vehicle applications, the dimension(s) in the first and/or second direction(s) may be at least 10 cm or at least 20 cm. The dimension(s) in the first and second direction(s) is/are suitably less than 100 cm, preferably less than 50 cm, more preferably less than 35 cm.

Said semi-crystalline polymer may comprise a film, suitably having a thickness of less than 1 mm, preferably less than 0.5 mm, more preferably less than 0.1 mm, especially less than 0.05 mm. The film may have a thickness of at least 5 μm.

Said polymer electrolyte membrane may comprise one or more layers wherein, suitably, at least one layer comprises a film of said semi-crystalline polymer. Said membrane may have a thickness of at least 5 μm and, suitably, less than 1 mm, preferably less than 0.5 mm, more preferably less than 0.1 mm, especially less than 0.05 mm.

Preferably, the identity of the semi-crystalline polymer at a surface or interface thereof is the same as the bulk of the polymer—that is, said semi-crystalline polymer is preferably not surface modified.

Said FCDF preferably includes an anode and a cathode suitably operatively connected to said semi-crystalline polymer of the PEM. Said anode and/or said cathode suitably include an ion-conducting polymer which may be as described in any statement herein. Preferably said semi-crystalline polymer of the PEM and that of the anode and/or cathode are made of the same polymeric material.

Said FCDF preferably includes a fuel supply receptacle. A pump is preferably provided for pumping the fuel to an anode chamber on one side of the PEM. Means is preferably provided for supplying an oxidising gas (e.g. air or oxygen) to the opposite side of the PEM. Said FCDF (e.g. DMFC) may be as described in the introduction of the present specification.

According to a second aspect of the invention, there is provided a plurality of fuel cells as described according to the first aspect. The fuel cells are preferably substantially identical to one another and are preferably provided in a stack in series. Greater than 50 or even greater than 100 of said fuel cells may be provided in a said stack.

Said plurality of fuel cells may together include more than 0.1 m², suitably more than 0.5 m², preferably more than 1 m², more preferably more than 5 m² of said semi-crystalline polymer. The amount of said polymer may be less than 100 m².

According to a third aspect of the present invention, there is provided a method of operating a FCDF, for example a DMFC, wherein the FCDF is as described according to the first aspect, the method comprising supplying a fuel to one side of the polymer electrolyte membrane (PEM). Suitably, an oxidizing gas, for example oxygen or air, is supplied to the other side of the PEM. The pressure of the gas may be at least 5 psig, preferably at least 10 psig. The pressure may be less than 50 psig, preferably less than 40 psig, more preferably les than 30 psig.

Said fuel is preferably a carbon-containing fuel. Said fuel preferably includes an alkyl moiety, for example a $C_aH_{2a+1}$— moiety where a is an integer suitably in the range 1-20 preferably 1-10, especially 1-5. Said fuel is preferably an alcohol. An especially preferred fuel is methanol.

According to a fourth aspect of the present invention, there is provided a method of manufacturing a FCDF, for example a DMFC having low fuel (e.g. methanol) cross-over, the method comprising incorporating a semi-crystalline polymer into a polymer electrolyte membrane of the fuel cell.

According to a fifth aspect of the present invention, there is provided the use of a semi-crystalline polymer for the manufacture of a polymer electrolyte membrane of a fuel cell, for reducing the level of fuel (e.g. methanol) cross-over in the cell, suitably compared to level of cross-over resulting from using similar amorphous polymers of the same conductivity.

Polymers having units I, II, III, IV, IV*, V and/or V* described above may be prepared by:

(a) polycondensing a compound of general formula

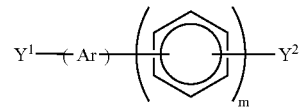

VI with itself wherein Y¹ represents a halogen atom or a group -EH and Y² represents a halogen atom or, if Y¹ represents a halogen atom, Y² represents a group E'H; or (b) polycondensing a compound of general formula

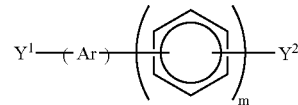

VI with a compound of formula

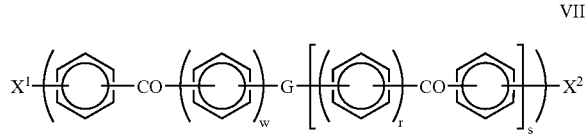

VII and/or with a compound of formula

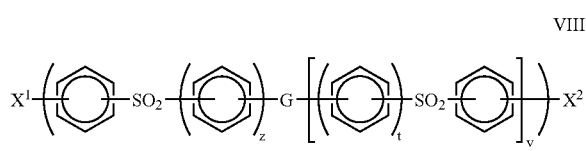

VIII wherein Y¹ represents a halogen atom or a group -EH (or -E'H if appropriate) and X¹ represents the other one of a halogen atom or group -EH (or -E'H if appropriate) and Y² represents a halogen atom or a group -E'H and X² represents the other one of a halogen atom or a group -E'H (or -EH if appropriate).

(c) optionally copolymerizing a product of a process as described in paragraph (a) with a product of a process as described in paragraph (b);

wherein the phenyl moieties of units VI, VII and/or VIII are optionally substituted; the compounds VI, VII and/or VIII are optionally sulphonated; and Ar, m, w, r, s, z, t, v, G, E and E' are as described above except that E and E' do not represent a direct link;

the process also optionally comprising sulphonating and/or cross-linking a product of the reaction described in paragraphs (a), (b) and/or (c) to prepare said polymer.

In some situations, the polymer prepared, more particularly phenyl groups thereof, may be optionally substituted with the groups hereinabove described after polymer formation.

Preferably, where $Y^1$, $Y^2$, $X^1$ and/or $X^2$ represent a halogen, especially a fluorine, atom, an activating group, especially a carbonyl or sulphone group, is arranged ortho- or para- to the halogen atom.

Preferred halogen atoms are fluorine and chlorine atoms, with fluorine atoms being especially preferred. Preferably, halogen atoms are arranged meta- or para- to activating groups, especially carbonyl groups.

Where the process described in paragraph (a) is carried out, preferably one of $Y^1$ and $Y^2$ represents a fluorine atom and the other represents an hydroxy group. More preferably in this case, $Y^1$ represents a fluorine atom and $Y^2$ represents an hydroxy group. Advantageously, the process described in paragraph (a) may be used when Ar represents a moiety of structure (i) and m represents 1.

When a process described in paragraph (b) is carried out, preferably, $Y^1$ and $Y^2$ each represent an hydroxy group. Preferably, $X^1$ and $X^2$ each represent a halogen atom, suitably the same halogen atom.

The polycondensation reaction described is suitably carried out in the presence of a base, especially an alkali metal carbonate or bicarbonate or a mixture of such bases. Preferred bases for use in the reaction include sodium carbonate and potassium carbonate and mixtures of these.

The identity and/or properties of the polymers prepared in a polycondensation reaction described may be varied according to the reaction profile, the identity of the base used, the temperature of the polymerisation, the solvent(s) used and the time of the polymerisation. Also, the molecular weight of a polymer prepared controlled by using an excess of halogen or hydroxy reactants, the excess being, for example, in the range 0.1 to 5.0 mole %.

In a polymer prepared in a said polycondensation reaction involving compounds of general formula VI, VII, and VIII, moieties of general formula VI, VII, and VIII (excluding end groups $Y^1$, $Y^2$, $X^1$ and $X^2$) may be present in regular succession (that is, with single units of one said moiety, separated by single units of another said moiety or moieties), or semi-regular succession (that is, with single units of one said moiety separated by strings of another moiety or moieties which are not all of the same length) or in irregular succession (that is, with at least some multiple units of one moiety separated by strings of other moieties that may or may not be of equal lengths). The moieties described are suitably linked through ether or thioether groups.

Also, moieties in compounds VI, VII and VIII arranged between a pair of spaced apart —O— atoms and which include a -phenyl-SO$_2$ or -phenyl-CO— bonded to one of the —O-atoms may, in the polymer formed in the polycondensation reaction, be present in regular succession, semi-regular succession or in irregular succession, as described previously.

In any sampled polymer, the chains that make up the polymer may be equal or may differ in regularity from one another, either as a result of synthesis conditions or of deliberate blending of separately made batches of polymer.

Compounds of general formula VI, VII and VIII are commercially available (eg from Aldrich U.K.) and/or may be prepared by standard techniques, generally involving Friedel-Crafts reactions, followed by appropriate derivatisation of functional groups. The preparations of some of the monomers described herein are described in P M Hergenrother, B J Jensen and S J Havens, Polymer 29, 358 (1988), H R Kricheldorf and U Delius, Macromolecules 22, 517 (1989) and P A Staniland, Bull, Soc, Chem, Belg., 98 (9-10), 667 (1989).

Where compounds VI, VII and/or VIII are sulphonated, compounds of formulas VI, VII and/or VIII which are not sulphonated may be prepared and such compounds may be sulphonated prior to said polycondensation reaction.

Sulphonation as described herein may be carried out in concentrated sulphuric acid (suitably at least 96% w/w, preferably at least 97% w/w, more preferably at least 98% w/w; and preferably less than 98.5% w/w) at an elevated temperature. For example, dried polymer may be contacted with sulphuric acid and heated with stirring at a temperature of greater than 40° C., preferably greater than 55° C., for at least one hour, preferably at least two hours, more preferably about three hours. The desired product may be caused to precipitate, suitably by contact with cooled water, and isolated by standard techniques. Sulphonation may also be effected as described in U.S. Pat. No. 5,362,836 and/or EP0041780.

Where a semi-crystalline copolymer is prepared comprising a first unit, a second crystalline unit and a third amorphous unit as described above, the process may comprise:

polycondensing a compound of formula $$X^1\text{-BM-}X^2 \qquad\qquad XVI$$

with a compound of formula $$Y^1\text{-SU-}Y^2 \qquad\qquad XVII$$

and with a compound of formula $$Y^1\text{-XT-}Y^2 \qquad\qquad XVIII$$

and with a compound of formula $$Z^1\text{-AM-}Z^2 \qquad\qquad XIX$$

thereby to prepare a copolymer, wherein $Y^1$ represents a halogen atom or a group -EH (or -E'H if appropriate) and $X^1$ represents the other one of a halogen atom or group -EH (or -E'H if appropriate), $Y^2$ represents a halogen atom or a group -E'H and $X^2$ represents the other one of a halogen atom or a group -E'H (or -EH if appropriate) and $Z^1$ and $Z^2$ represent a halogen atom or a group -EH (or E'H if appropriate);

and wherein BM represents part of a base monomer, SU represents part of a moiety which is functionalised or can be functionalised (suitably independently of other moieties in the copolymer) to provide ion-exchange sites, XT represents a part of a crystalline or crystallisable moiety and AM represents part of an amorphous moiety.

The polycondensation reaction may be carried out as described above.

Advantageously, a crystallisable or semi-crystalline polymer for use in FCDFs as described herein may be treated as described in GB0031207.4 with a means to increase its crystallinity (hereinafter "crystallinity increasing means"). The level of crystallinity may be at least 1%, suitably at least 5%, preferably at least 10%, more preferably at least 15%, especially at least 20% greater after treatment than the level before treatment.

Said crystallinity increasing means may comprise heating said crystallisable or semi-crystalline polymer, suitably when in a substantially dry state. Preferably, said polymer is heated at a temperature greater than its Tg, suitably under an inert, e.g. a nitrogen, atmosphere, for at least 0.5 minutes and less than 30 minutes. Alternatively and/or additionally, said crystallinity increasing means may comprise treatment of said first ion-conducting polymeric material with a crystallinity increasing solvent. Preferred such solvents are polar aprotic solvents and may include acetone, dimethyacetamide (DMA), dimethylformamide (DMF), tetrahydrofuran (THF) and dichloromethane. After use of a crystallinity increasing solvent, especially acetone or dichloromethane, there is preferably a further step which involves removal of the solvent, for example by washing with acetone.

Details on the preparation of polymers and processes for the preparation of membranes therefrom are provided in WO00/15691, PCT/GB00/03449, GB0031209.0, GB0031208.2 and GB0031207.4 and the contents of the aforesaid are incorporated herein by reference.

Any feature of any aspect of any invention or embodiment described herein may be combined with any feature of any aspect of any other invention or embodiment described herein.

Specific embodiments of the invention will now be described, by way of example, with reference to FIG. 1 which is a schematic representation of a Direct Methanol Fuel Cell (DMFC).

The following abbreviations are used hereinafter

BP—4,4'-dihydroxybiphenyl
DHB—4,4'-dihydroxybenzophenone
Bis-S—4,4'-dihydroxydiphenylsulphone
2,4-DHB is 2,4-dihydroxybenzophenone
BDF—4,4'-difluorobenzophenone Unless otherwise stated, all chemicals referred to hereinafter were used as received from Sigma-Aldrich Chemical Company, Dorset, U.K.

The examples describe the preparation of polymers which are crystallisable and/or semi-crystalline and can, therefore, be used as polymer electrolyte membranes to reduce methanol cross over in DMFCs. Various examples of such polymers are included to illustrate how the level of crystallinity may be adjusted. For example, crystallinity can be reduced by incorporation of moieties derived from 2,4-DHB and/or Bis-S in the polymer chain (see Examples 1b-d, 2b-2g, 3a-3c and 7a to 7f). Additionally, treatments are described (see Examples 6, 9, 14, 16 and 18) whereby polymers can be treated to increase their crystallinity and/or boiling water resistance. Examples of amorphous polymers are included for comparison with the crystallisable/crystalline polymers.

A comparison of methanol cross-over for polymer membranes made out of the known material Nafion, an amorphous polyaryletherketone sulphone and a semi-crystalline polymer are also included to illustrate the advantages of using semi-crystalline polymers described.

EXAMPLE 1a

A 700 ml flanged flask fitted with a ground glass Quickfit lid, stirrer/stirrer guide, nitrogen inlet and outlet was charged with 4,4'-difluorobenzophenone (89.03 g, 0.408 mole), 4,4'-dihydroxybiphenyl (37.24 g, 0.20 mole) 4,4'-dihydroxybenzophenone (42.84 g, 0.20 mole), and diphenysulphone (332 g) and purged with nitrogen for over 1 hour. The contents were then heated under a nitrogen blanket to between 140 and 150° C. to form an almost colourless solution. While maintaining a nitrogen blanket, dried sodium carbonate (43.24 g, 0.408 mole) was added. The temperature was raised gradually to 330° C. over 3 hours then maintained for 1 hours.

The reaction mixture was allowed to cool, milled and washed with acetone and water. The resulting polymer was dried in an air oven at 120° C. The polymer had a melt viscosity at 400° C., 1000 sec$^{-1}$ of 0.48 kNsm$^{-2}$.

EXAMPLE 1b

A 700 ml flanged flask fitted with a ground glass Quickfit lid, stirrer/stirrer guide, nitrogen inlet and outlet was charged with 4,4'-difluorobenzophenone (89.03 g, 0.408 mole), 4,4'-dihydroxybiphenyl (37.24 g, 0.20 mole), 4,4'-dihydroxydiphenylsulphone (10.01 g, 0.04 mole), 4,4'-dihydroxybenzophenone (34.28, 0.16 mole) and diphenysulphone (332 g) and purged with nitrogen for over 1 hour. The contents were then heated under a nitrogen blanket to between 140 and 150° C. to form an almost colourless solution. While maintaining a nitrogen blanket, dried sodium carbonate (43.24 g, 0.408 mole) was added. The temperature was raised gradually to 320° C. over 3 hours then maintained for 1.5 hours.

The reaction mixture was allowed to cool, milled and washed with acetone and water. The resulting polymer was dried in an air oven at 120° C. The polymer had a melt viscosity at 400° C., 1000 sec$^{-1}$ of 0.34 kNsm$^{-2}$.

EXAMPLE 1c

A 700 ml flanged flask fitted with a ground glass Quickfit lid, stirrer/stirrer guide, nitrogen inlet and outlet was charged with 4,4'-difluorobenzophenone (89.03 g, 0.408 mole), 4,4'-dihydroxybiphenyl (37.24 g, 0.20 mole), 4,4'-dihydroxydiphenylsulphone (15.02 g, 0.06 mole), 4,4'-dihydroxybenzophenone (29.99 g, 0.14 mole) and diphenysulphone (332 g) and purged with nitrogen for over 1 hour. The contents were then heated under a nitrogen blanket to between 140 and 150° C. to form an almost colourless solution. While maintaining a nitrogen blanket, dried sodium carbonate (43.24 g, 0.408 mole) was added. The temperature was raised gradually to 320° C. over 3 hours then maintained for 1 hours.

The reaction mixture was allowed to cool, milled and washed with acetone and water. The resulting polymer was dried in an air oven at 120° C. The polymer had a melt viscosity at 400° C., 1000 sec$^{-1}$ of 0.42 kNsm$^{-2}$.

EXAMPLE 1d (Comparative)

A 700 flanged flask fitted with a ground glass Quickfit lid, stirrer/stirrer guide, nitrogen inlet and outlet was charged with 4,4'-difluorobenzophenone (89.03 g, 0.408 mole), 4,4'-dihydroxybiphenyl (37.24 g, 0.20 mole) 4,4'-dihydroxydiphenylsulphone (50.05 g, 0.20 mole), and diphenysulphone (332 g) and purged with nitrogen for over 1 hour. The contents were then heated under a nitrogen blanket to between 140 and 150° C. to form an almost colourless solution. While maintaining a nitrogen blanket, dried sodium carbonate (42.44 g, 0.4 mole) and potassium carbonate (1.11 g, 0.008 mole) was added. The temperature was raised gradually to 315° C. over 3 hours then maintained for 30 minutes.

The reaction mixture was allowed to cool, milled and washed with acetone and water. The resulting polymer was dried in an air oven at 120° C. The polymer had a melt viscosity at 400° C., 1000 sec$^{-1}$ of 0.43 kNsm$^{-2}$.

EXAMPLE 2a

A 700 ml flanged flask fitted with a ground glass Quickfit lid, stirrer/stirrer guide, nitrogen inlet and outlet was charged with 4,4'-difluorobenzophenone (89.03 g, 0.408 mole), 4,4'-dihydroxybiphenyl (24.83 g, 0.133 mole) 4,4'-dihydroxybenzophenone (57.41 g, 0.268 mole), and diphenysulphone (332 g) and purged with nitrogen for over 1 hour. The contents were then heated under a nitrogen blanket to between 140 and 150° C. to form an almost colourless solution. While maintaining a nitrogen blanket, dried sodium carbonate (43.24 g, 0.408 mole) was added. The temperature was raised gradually to 330° C. over 3 hours then maintained for 1 hours.

The reaction mixture was allowed to cool, milled and washed with acetone and water. The resulting polymer was dried in an air oven at 120° C. The polymer had a melt viscosity at 400° C., 100 sec$^{-1}$ of 0.54 kNsm$^2$.

EXAMPLE 2b

A 700 ml flanged flask fitted with a ground glass Quickfit lid, stirrer/stirrer guide, nitrogen inlet and outlet was charged with 4,4'-difluorobenzophenone (89.03 g, 0.408 mole), 4,4'-dihydroxybiphenyl (24.83 g, 0.133 mole), 4,4'-dihydroxydiphenylsulphone (13.35 g, 0.053 mole), 4,4'-dihydroxybenzophenone (45.7 g, 0.213 mole) and diphenysulphone (332 g) and purged with nitrogen for over 1 hour. The contents were then heated under a nitrogen blanket to between 140 and 150° C. to form an almost colourless solution. While maintaining a nitrogen blanket, dried sodium carbonate (43.24 g, 0.408 mole) was added. The temperature was raised gradually to 320° C. over 3 hours then maintained for 1.5 hours.

The reaction mixture was allowed to cool, milled and washed with acetone and water. The resulting polymer was dried in an air oven at 120° C. The polymer had a melt viscosity at 400° C., 1000 sec$^{-1}$ of 0.37 kNsm$^{-2}$.

EXAMPLES 2c-2f AND 2g (Comparative)

The polymerisation procedure of Example 2b was followed, for 2c-2f except that copolymers were prepared by varying the mole ratios of the hydroxy-containing reactants. The polymerisation procedure for 2g is described below.

A 700 ml flanged flask fitted with a ground glass Quickfit lid, stirrer/stirrer guide, nitrogen inlet and outlet was charged with 4,4'-difluorobenzophenone (89.03 g, 0.408 mole), 4,4'-dihydroxybiphenyl (24.83 g, 0.133 mole) 4,4'-dihydroxydiphenylsulphone (66.73 g, 0.267 mole), and diphenysulphone (332 g) and purged with nitrogen for over 1 hour. The contents were then heated under a nitrogen blanket to between 140 and 150° C. to form an almost colourless solution. While maintaining a nitrogen blanket, dried sodium carbonate (42.44 g, 0.4 mole) and potassium carbonate (1.11 g, 0.008 mole) were added. The temperature was raised gradually to 315° C. over 3 hours then maintained for 0.5 hours.

The reaction mixture was allowed to cool, milled and washed with acetone and water. The resulting polymer was dried in an air oven at 120° C. The polymer had a melt viscosity at 400° C., 1000 sec$^{-1}$ of 0.62 kNsm$^2$.

A summary of the mole ratios and MVs are detailed in the Table below. Example 2g is an amorphous equivalent of the other polymers.

| Example | Polymer composition (mole ratio) | | | | MV (kNsm$^{-2}$) |
|---|---|---|---|---|---|
| | BDF | BP | DHB | Bis-S | |
| 2a | 1.02 | 0.33 | 0.67 | — | 0.54 |
| 2b | 1.02 | 0.33 | 0.536 | 0.133 | 0.37 |
| 2c | 1.02 | 0.33 | 0.402 | 0.268 | 0.47 |
| 2d | 1.02 | 0.33 | 0.335 | 0.335 | 0.48 |
| 2e | 1.02 | 0.33 | 0.268 | 0.402 | 0.48 |
| 2f | 1.02 | 0.33 | 0.133 | 0.536 | 0.53 |
| 2g | 1.02 | 0.33 | — | 0.67 | 0.62 |

EXAMPLE 3a

A 700 ml flanged flask fitted with a ground glass Quickfit lid, stirrer/stirrer guide, nitrogen inlet and outlet was charged with 4,4'-difluorobenzophenone (89.03 g, 0.408 mole), 4,4'-dihydroxybiphenyl (24.83 g, 0.133 mole), 2,4-dihydroxybenzophenone (11.42 g, 0.053 mole), 4,4'-dihydroxybenzophenone (45.7 g, 0.213 mole) and diphenysulphone (332 g) and purged with nitrogen for over 1 hour. The contents were then heated under a nitrogen blanket to between 140 and 150° C. to form an almost colourless solution. While maintaining a nitrogen blanket, dried sodium carbonate (43.24 g, 0.408 mole) was added. The temperature was raised gradually to 320° C. over 3 hours then maintained for 1.5 hours.

The reaction mixture was allowed to cool, milled and washed with acetone and water. The resulting polymer was dried in an air oven at 120° C. The polymer had a melt viscosity at 400° C., 1000 sec$^{-1}$ of 0.80 kNsm$^{-2}$.

EXAMPLES 3b AND 3c

The polymerisation procedure of Example 3a was followed except that copolymers were prepared with different mole ratios of the hydroxy-containing reactants. A summary of the mole ratios and Mvs for Examples 3a-3c are detailed in the Table below.

| Example | Polymer Composition (mole ratio) | | | | MV (kNsm$^{-2}$) |
|---|---|---|---|---|---|
| | BDF | BP | 4,4'-DHB | 2,4-DHB | |
| 3a | 1.02 | 0.33 | 0.533 | 0.133 | 0.70 |
| 3b | 1.02 | 0.33 | 0.402 | 0.268 | 0.38 |
| 3c | 1.02 | 0.33 | 0.133 | 0.533 | 0.47 |

EXAMPLE 4 General Sulphonation Procedure

The polymers of Examples 1-3 were sulphonated by stirring each polymer in 98% sulphuric acid (3.84 g polymer/100 g sulphuric acid) for 21 hours at 50° C. Thereafter, the reaction solution was allowed to drip into stirred deionised water. Sulphonated polymer precipitated as free-flowing beads. Recovery was by filtration, followed by washing with deionised water until the pH was neutral and subsequent drying. In general, titration confirmed that 100 mole % of the biphenyl units had sulphonated, giving one sulphonic acid group, ortho to the ether linkage, on each of the two aromatic rings comprising the biphenyl unit. Also, it was confirmed that the naphthalene unit was sulphonated on both aromatic rings in the polymers of Example 3a-3c.

EXAMPLE 5a Membrane Fabrication

Membranes were produced from the polymers from Examples 1 to 3 after sulphonation as described in Example 4 by dissolving respective polymers in N-methylpyrrolidone (NMP). The polymers were dissolved at 80° C. at their maximum concentration as shown in the Table below. In one example, a 50:50 w/w blend of the polymers described in Examples 2e and 2f, sulphonated as described in Example 4, was used to prepare a membrane.

The homogeneous solutions were cast onto clean glass plates and then drawn down to give 400 micron films, using a Gardner Knife. The solvent was then evaporated at 100° C. under vacuum for 24 hours.

EXAMPLE 5b Boiling Water Uptake

The following general procedure was followed to determine the Boiling Water Uptake.

5 cm×5 cm×50 microns (unless otherwise stated) samples of membranes were separately immersed in boiling deionised water (500 ml) for 60 mins, removed and dried quickly with lint-free paper to remove surface water, weighed, dried in an oven at 50° C. for 1 day, allowed to cool to ambient temperature in a desiccator then weighed quickly. The % water-uptake was calculated as described below:

$$\% \text{ Water-uptake} = \frac{\text{Wet Weight} - \text{Dry Weight}}{\text{Dry Weight}} \times 100$$

Results for membranes assessed are provided in the Table presented in Example 6.

EXAMPLE 6

Post Treatment of the Membranes Prepared from Sulphonated Polymers 1-3 with Acetone 5 cm×5 cm×40 microns samples of membranes prepared from polymers of Examples 1-3 after sulphonation and fabrication as described in Examples 4 and 5a were separately immersed in refluxing acetone (100 ml) for 60 mins, removed and dried in an oven at 50° C. for 1 day, immersed in boiling deionised water (500 ml) for 60 mins, removed and dried quickly with lint-free paper to remove surface water, weighed, dried in an oven at 50° C. for 1 day, allowed to cool to ambient temperature in a desiccator then weighed quickly. The % water uptake of each membrane was as calculated previously and summarised in the Table below. Whilst the sulphonated polymer from Example 2a was insoluble in NMP at 80° C. (the temperature at which membranes were fabricated—see Example 5a), the polymer was found to be soluble in NMP at higher temperatures.

| Sulphonated polymer from Example* | Theoretical EW | Measured EW (by titration) | Concentration in NMP (% w/w) | Boiling Water Uptake before acetone treatment (%) | Boiling Water Uptake after acetone treatment (%) |
|---|---|---|---|---|---|
| 1a | 458 | 472 | 4 | 237 | 116 |
| 1b | 462 | 483 | 7.5 | 300 | 125 |
| 1c | 464 | | 10 | 320 | 152 |
| 1d | 476 | 492 | 15 | Soluble | Soluble |
| 2a | 654 | 674 | Insoluble | — | |
| 2b | 657 | 670 | 5 | 69 | 61 |
| 2c | 663 | 667 | 7.5 | 77 | 48 |
| 2d | 670 | 671 | 7.5 | 81 | 57 |
| 2e | 676 | 685 | 10 | 90 | 63 |
| 2f | 683 | 660 | 15 | 172 | 100 |
| 2g | 690 | 663 | 15 | 165 | 170 |
| 3a | 647 | 666 | 5 | 73 | 58 |
| 3b | 655 | 671 | 10 | 100 | 69 |
| 3c | 670 | 681 | 15 | 518 | 208 |
| 50:50 w/w blend of polymers from Examples 2e and 2f | 680 | | 15 | 128 | 73 |

*It should be appreciated that the polymers of the referenced Examples are sulphonated as described in Example 4.

EXAMPLE 7a

A 700 ml flanged flask fitted with a ground glass Quickfit lid, stirrer/stirrer guide, nitrogen inlet and outlet was charged with 4,4'-difluorobenzophenone (89.03 g, 0.408 mole), 4,4'-dihydroxybiphenyl (29.79 g, 0.16 mole), 4,4'-dihydroxydiphenylsulphone (36.04 g, 0.144 mole), 4,4'-dihydroxybenzophenone (20.57 g, 0.096 mole) and diphenysulphone (332 g) and purged with nitrogen for over 1 hour. The contents were then heated under a nitrogen blanket to between 140 and 150° C. to form an almost colourless solution. While maintaining a nitrogen blanket, dried sodium carbonate (43.24 g, 0.408 mole) was added. The temperature was raised gradually to 320° C. over 3 hours then maintained for 1.5 hours.

The reaction mixture was allowed to cool, milled and washed with acetone and water. The resulting polymer was dried in an air oven at 120° C. The polymer had a melt viscosity at 400° C., 1000 sec$^{-1}$ of 0.6 kNsm$^{-2}$.

EXAMPLES 7b-7e AND 7f (Comparative)

The polymerisation procedure of Example 7a was followed, except that copolymers were prepared by varying the mole ratios of the hydroxy-containing reactants. A summary of the mole ratios and the MVs are detailed in the Table below.

| Example | Polymer composition (mole ratio) | | | | MV (kNsm$^{-2}$) |
|---|---|---|---|---|---|
| | BDF | BP | DHB | Bis-S | |
| 7a | 1.02 | 0.4 | 0.24 | 0.36 | 0.6 |
| 7b | 1.02 | 0.4 | 0.36 | 0.24 | 0.21 |
| 7c | 1.02 | 0.4 | 0.39 | 0.21 | 0.32 |
| 7d | 1.02 | 0.4 | 0.42 | 0.18 | 0.44 |

-continued

| Example | Polymer composition (mole ratio) | | | | MV (kNsm$^{-2}$) |
|---|---|---|---|---|---|
| | BDF | BP | DHB | Bis-S | |
| 7e | 1.02 | 0.4 | 0.6 | — | 0.45 |
| 7f | 1.02 | 0.4 | — | 0.6 | 0.26 |

EXAMPLES 8a-f

Sulphonation and Subsequent Dissolution of Polymers from Examples 7a-f

The polymers from Examples 7a-f respectively were sulphonated as described in Example 4, dissolved in NMP at 150° C., filtered through a 10 micron filter, cast on to clean glass plates and drawn down, using a Gardner Knife. The solvent was evaporated at 100° C. under vacuum for 24 hours producing membranes of mean thickness of 40 microns. The boiling water uptake was determined as described in Example 5b. The results are detailed in the Table in Example 9.

EXAMPLE 9

Post Treatment of the Membranes Prepared from Sulphonated Polymers 8a-8f with Acetone The procedure of Example 6 was followed, except that the membranes from 8a-8f were immersed in refluxing acetone. The % water-uptake of each membrane was calculated as described above. The results are summarised in the Table below.

| Sulphonated polymer from Example | Concentration in NMP (% w/w) | Boiling Water Uptake before acetone treatment (%) | Boiling Water Uptake After acetone treatment (%) | Theoretical EW | Measured EW (by titration) |
|---|---|---|---|---|---|
| 7a | 15 | 550 | 130 | 564 | 564 |
| 7b | 10 | 190 | 90 | 559 | 564 |
| 7c | 10 | 135 | 81 | 558 | 571 |
| 7d | 10 | 109 | 58 | 557 | 591 |
| 7e | 8 | 82 | 69 | 550 | 572 |
| 7f | 15 | 520 | 520 | 583 | 602 |

EXAMPLE 10

Blends with Polyethersulphone

Sulphonated polymer from Example 2e and polyethersulphone were dissolved in N-methylpyrrolidone (NMP) at concentrations shown in the Table below. The homogeneous solutions were cast onto clean glass plates and then drawn down to give 400 micron films, using a stainless steel Gardner Knife. Evaporation at 100° C. under vacuum for 24 hours produced membranes of mean thickness 40 microns.

The procedure of Example 6 was followed, except that the membranes from above were immersed in refluxing acetone. The % water-uptake of each membrane before and after acetone treatment was calculated as described above. The results are summarised in the Table below.

| Sulphonated Polymer from Example 2e % w/w | Polyether sulphone % w/w | Boiling Water Uptake before acetone treatment (%) | Boiling Water Uptake after acetone treatment (%) |
|---|---|---|---|
| 15 | 0 | 102 | 61 |
| 14.25 | 0.75 | 125 | 74 |
| 13.5 | 1.5 | 105 | 67 |

EXAMPLE 11

Blend with Polyethersulphone

The procedure of Example 10 was followed except that sulphonated polymer from Example 7d was used instead of that from Example 2e. Results for the boiling water uptake, before and after acetone treatment, are detailed in the Table below.

| Sulphonated Polymer from Example 8d % w/w | Polyether Sulphone % w/w | Boiling Water Uptake before acetone treatment (%) | Boiling Water Uptake after acetone treatment (%) |
|---|---|---|---|
| 15 | 0 | 109 | 58 |
| 14.25 | 0.75 | 84 | 59 |
| 13.5 | 1.5 | 74 | 54 |
| 12.75 | 2.25 | 69 | 48 |
| 12.0 | 3.0 | 49 | 39 |

EXAMPLE 12

A 250 ml 3-necked, round-bottomed fitted with a stirrer/stirrer guide, nitrogen inlet and outlet was charged with 4,4'-difluorobenzophenone (11.36 g, 0.052 mole), 4,4'-bis(4-chlorophenylsulphonyl)biphenyl (LCDC) (25.17 g, 0.05 mole), 4,4'-dihydroxybiphenyl (6.21 g, 0.0333 mole), 4,4'-dihydroxybenzophenone (14.28 g, 0.0667 mole), and diphenysulphone (90 g) and purged with nitrogen for over 1 hour. The contents were then heated under a nitrogen blanket to between 140 and 150° C. to form an almost colourless solution. While maintaining a nitrogen blanket, dried sodium carbonate (10.6 g, 0.1 mole) and potassium carbonate (0.28 g, 0.002 mole) were added. The temperature was raised gradually to 315° C. over 3 hours then maintained for 1 hour.

The reaction mixture was allowed to cool, milled and washed with acetone and water. The resulting polymer was dried in an air oven at 120° C. The polymer had a melt viscosity at 400° C., 1000 sec$^{-1}$ of 0.18 kNsm$^{-2}$.

EXAMPLE 13

A 250 ml 3-necked, round-bottomed fitted with a stirrer/stirrer guide, nitrogen inlet and outlet was charged with 4,4'-difluorobenzophenone (11.02 g, 0.0505 mole), 4,4'-dichlorodiphenylsulphone (14.36 g, 0.05 mole), 4,4'-dihydroxybiphenyl (6.21 g, 0.0333 mole), 4,4'-dihydroxybenzophenone (14.28 g, 0.0667 mole), and diphenysulphone (83 g) and purged with nitrogen for over 1 hour. The contents were then heated under a nitrogen blanket to between 140 and 150° C. to form an almost colourless solution. While maintaining a nitrogen blanket, dried sodium carbonate (10.60 g, 0.1 mole) and potassium carbonate (0.28 g, 0.002 mole) were added. The temperature was raised gradually to 315° C. over 3 hours then maintained for 140 minutes.

The reaction mixture was allowed to cool, milled and washed with acetone and water. The resulting polymer was dried in an air oven at 120° C. The polymer had a melt viscosity at 400° C., 1000 sec$^{-1}$ of 0.39 kNsm$^{-2}$.

EXAMPLE 14

Sulphonation of and Subsequent Dissolution, Membrane Fabrication and Post Treatment with Acetone of Polymers from Examples 12 and 13

The polymers from Examples 12 and 13 were sulphonated as described in Example 4 and dissolved in NMP at 15% w/w at 80° C. and room temperature respectively. The homogeneous solutions were filtered through a 10 micron filter, cast on to clean glass plates and drawn down to give 400 micron films, using a Gardner Knife. The solvent was evaporated at 100° C. under vacuum for 24 hours. The boiling water uptake was 39 and 108% for the sulphonated polymer from Example 12 and 13 respectively, determined as described in Example 5b.

The procedure of Example 6 was followed, except that the membranes from above were immersed in refluxing acetone. The boiling water-uptake was 31 and 46% for the sulphonated polymer from Example 12 and 13 respectively after post treatment.

EXAMPLES 15a-15d

Sulphonation of Polyetherketone and is Subsequent Dissolution

A 500 ml, 3-necked, round-bottomed flask fitted with a stirrer/stirrer guide, nitrogen inlet and outlet and a thermometer was charged with 98% sulphuric acid (180 g) and, while stirring, polyetherketone (PEK™ P22, Victrex plc)(20 g) was added. The temperature was increased to 55° C. and oleum (20% free SO$_3$) (120 g) was added. The solution was stirred for 60 minutes at 55° C. The solution was quickly cooled to 20° C., thereafter, allowed to drip into stirred deionised water. Sulphonated polymer precipitated as free-flowing beads. Recovery was by filtration, followed by washing with deionised water until the pH was neutral and subsequent drying. By titration the Equivalent Weight was 476.

The above procedure was repeated three times except that the sulphonating solution was heated to 35° C. before oleum was added and maintained at that temperature for 60 mins before being rapidly cooled to 20° C. The Equivalent Weights of the sulphonated polymers was 568, 667 and 758.

The sulphonated polyetherketone polymers described above were separately dissolved in NMP, filtered through a 10 micron filter, cast on to clean glass plates and drawn down, using a Gardner Knife. The solvent was evaporated at 100° C. under vacuum for 24 hours producing membranes of mean thickness of 40 microns. The boiling water uptake was determined as described above and the results are detailed in the Table presented in Example 16.

EXAMPLE 16

Post Treatment of the Membranes from 15a-15d with Acetone

The procedure of Example 6 was followed, except that the membranes from Examples 15a-15d were immersed in refluxing acetone. The % water-uptake of each membrane was calculated as described above and summarised in the Table below.

| Sulphonated polymer from Example | EW | Boiling Water uptake before acetone treatment (%) | Boiling Water uptake after acetone Treatment (%) |
| --- | --- | --- | --- |
| 15a | 476 | Sample broke up | 124 |
| 15b | 568 | 950 | 72 |
| 15c | 670 | 370 | 56 |
| 15d | 758 | 80 | 51 |

EXAMPLE 17

Sulphonation of Polyetheretherketone and Subsequent Dissolution

A 500 ml, 3-necked, round-bottomed flask fitted with a stirrer/stirrer guide, nitrogen inlet and outlet and a thermometer was charged with 98% sulphuric acid (180 g). The sulphuric acid was heated under a blanket of nitrogen to 50° C. While maintaining a nitrogen blanket and stirring polyetheretherketone (PEEK™ 450P, Victrex plc) was added. The polymer dissolved and was stirred at 50° C. for 90 minutes. The solution was quickly cooled to 20° C., thereafter allowed to drip into stirred deionised water. Sulphonated polymer precipitated as free-flowing beads. Recovery was by filtration, followed by washing with deionised water until the pH was neutral and subsequent drying. By titration the Equivalent Weight was 644.

The sulphonated polymer described above was dissolved in NMP (15% w/w), filtered through 10 micron filter, cast on to a clean glass plate and drawn down, using a Gardner Knife. The solvent was evaporated at 100° C. under vacuum for 24 hours producing a membrane of mean thickness of 40 microns. In boiling water the membrane was swollen excessively and broke into pieces.

EXAMPLE 18

Post Treatment of the Membrane From Example 17

The procedure of Example 6 was followed, except that the membrane from the Example 17 was immersed in refluxing acetone. In boiling water the membrane remained intact and the % water uptake was 127% as calculated as described above.

EXAMPLE 19

Determination of the Crystallinity Index Values of Sulphonated Polymers from Examples 2c, 2e and 2g Before and After Acetone Treatment by WAXS Crystallinity can be quantified, in one method, by defining a "crystallinity index" for measurements made by Wide Angle X-ray Scattering (WAXS). This approach defines the measurement in relation to the WAXS pattern. The measured area of crystalline peaks in the WAXS pattern is taken as a percentage of the total crystalline and amorphous scatter over a chosen angular range of the pattern. Crystallinity index should, to a first approximation, be proportional to crystallinity for broadly similar polymer materials. It is constrained to be zero when crystallinity is zero and 100% when crystallinity is 100%.

Membranes of the sulphonated polymers from Examples 2c, 2e and 2g as sulphonated in Example 4, membrane fabricated in Example 5a and post treated with acetone as described in Example 6 were examined by WAXS as described below.

The membranes were analysed using a Siemens D5000 X-ray diffractometer with Cu K-alpha radiation and a Kevex energy dispersive detector. Measurements were made from a single membrane sheet mounted in symmetrical reflection geometry. A programmable divergence slit was used to maintain a constant irradiated region of the specimen surface 6 mm long over a 2-theta measurement range of 10-49°.

The WAXS pattern of the membrane from Example 2g before and after acetone treatment exhibited only broad amorphous scatter, whereas the patterns of the membranes from Examples 2c and 2e, before and after acetone treatment exhibited sharper, crystalline peaks in addition to amorphous bands.

The measured WAXS patterns were analysed by first making a background correction, subtracting the corresponding WAXS pattern from a blank specimen holder. The resulting patterns were fitted by a combination of a pattern measured from a similar but amorphous membrane film and a set of peaks (at approximately 18.8, 20.8, 22.9, 29.1 and 40.0° 2-theta) corresponding to those observed in the more crystalline membranes. The crystallinity index was calculated as the total area fitted by these peaks taken as a percentage of the combined area of the fitted peaks and the fitted amorphous pattern.

The results are detailed in the Table below.

| Sulphonated polymer from Example | Crystallinity Index (%) | |
|---|---|---|
| | Before acetone treatment | After acetone treatment |
| 2g | 0 | 0 |
| 2e | 2 | 5.5 |
| 2c | 7 | 9 |

EXAMPLE 20

Determination of the Crystallinity Index Values of Sulphonated Polymers from Examples 7c and 7f by WAXS Membranes of the sulphonated polymers from Examples 7c and 7f as prepared in Examples 8c and 8f and post treated with acetone in Example 9 were examined by WAXS as described in the previous Example.

The WAXS pattern of the membrane from Example 7f before and after acetone treatment exhibited only broad amorphous scatter, whereas the patterns of the membrane from Examples 7c before and after acetone treatment exhibited sharper, crystalline peaks in addition to amorphous bands.

The results are detailed in the Table below.

| Sulphonated polymer from Example | Crystallinity Index (%) | |
|---|---|---|
| | Before acetone treatment | After acetone treatment |
| 7f | 0 | 0 |
| 7c | 6 | 12 |

EXAMPLE 21

Comparisons of Methanol Cross-Over

A two compartment, water-jacketed, glass diffusion cell was used to determine the permeability of a membrane to methanol. One compartment of the cell (Compartment A) was charged with an 8 vol % solution of methanol (BDH, Analar), and 0.1 vol % 1-propanol (BDH, Analar) in deionised water, the other compartment (Compartment B) was charged with a solution of 0.1 vol % 1-propanol in deionised water. The membrane under investigation was pretreated by immersion in deionised water for 120 minutes at room temperature then clamped between the two compartments so that the area of membrane in contact with the solutions was 19.63 cm$^2$. The solutions in both compartments were continually stirred during the experiment by using magnetic followers and the temperature of the cell was maintained at 60° C. by means of the water jacket.

For each membrane fresh solutions were used in Compartments A and B and the concentration of methanol in Compartment B was measured at regular intervals during the experiment by removing 5 µl aliquots and analysing the solution by gas chromatography (Varian 3400, GC, fitted with Chrompack 80-100 mesh POROPAK Q packed column, using the temperature profile 105° C. for 5 minutes, ramping at 10° C./minute to 130° C. and holding for 12 minutes) using 1-propanol as an internal standard. The results are detailed in the Table below

| Sulphonated Polymer | Thickness (µm) | EW | Concentration of Methanol in Compartment B (vol %) | | | | | |
|---|---|---|---|---|---|---|---|---|
| | | | 10 mins | 20 mins | 30 mins | 40 mins | 50 mins | 60 mins |
| Nafion 115* | 125 | 1100 | 0.12 | 0.33 | 0.60 | 0.87 | 1.16 | 1.33 |
| Nafion 112 | 50 | 1100 | 0.41 | 0.72 | 1.07 | 1.45 | 1.81 | 2.10 |
| Sulphonated polymers before acetone treatment | | | | | | | | |
| Example 2g | 40 | 690 | 0.09 | 0.26 | 0.43 | 0.61 | 0.82 | 0.99 |
| Example 2e | 40 | 670 | 0.14 | 0.25 | 0.41 | 0.58 | 0.75 | 0.90 |
| Example 2c | 40 | 667 | 0.08 | 0.21 | 0.37 | 0.50 | — | 0.64 |
| Example 7f | 40 | 583 | 0.27 | 0.50 | 0.89 | 1.24 | 1.44 | 1.83 |
| Example 7c | 40 | 558 | 0.14 | 0.34 | 0.42 | 0.55 | 0.85 | 1.01 |
| Example 7d | 40 | 557 | 0.13 | 0.34 | 0.48 | 0.64 | 0.78 | 0.93 |
| Sulphonated polymers after acetone treatment | | | | | | | | |
| Example 2e | 40 | 670 | 0.06 | 0.19 | 0.29 | 0.40 | 0.55 | 0.60 |
| Example 2c | 40 | 667 | 0.05 | 0.14 | 0.23 | 0.38 | 0.50 | 0.57 |
| Example 7c | 40 | 558 | 0.13 | 0.29 | 0.49 | 0.67 | 0.82 | 0.90 |
| Example 7d | 40 | 557 | 0.12 | 0.27 | 0.41 | 0.61 | 0.82 | 0.91 |
| Example 17 | 40 | 644 | 0.06 | 0.19 | 0.29 | 0.44 | 0.58 | 0.70 |

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiments). The invention extend to any novel one, or any novel combination, of the features disclosed in this specification (including any accompanying claims, abstract and drawings), or to any novel one, or any novel combination, of the steps of any method or process so disclosed.

The invention claimed is:

1. A fuel cell, wherein said fuel cell is powered by direct fuel and wherein said fuel cell has a polymer electrolyte membrane which includes a semi-crystalline polymer having a level of crystallinity of at least 0.5%, wherein said semi-crystalline polymer is one having a moiety of formula

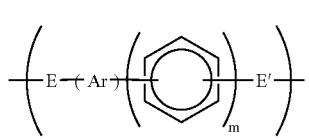

I and/or a moiety of formula

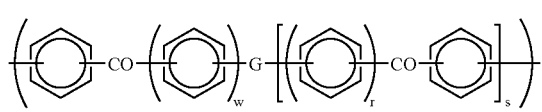

II and/or a moiety of formula

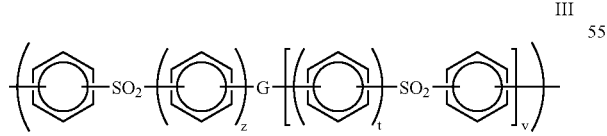

III wherein at least some of the units I, II and/or III are functionalized to provide ion-exchange sites; wherein the phenyl moieties in units I, II, and III are independently optionally substituted and optionally cross-linked; wherein said material is crystallisable and/or semi-crystalline; and wherein m,r,s,t,v,w and z independently represent zero or a positive integer, E and E' independently represent an oxygen or a sulphur atom or a direct link, G represents an oxygen or sulphur atom, a direct link or a —O-Ph-O— moiety where Ph represents a phenyl group and Ar is selected from one of the following moieties (i)* or (i) to (x) which is bonded via one or more of its phenyl moieties to adjacent moieties

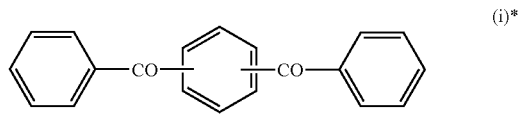

(i)*

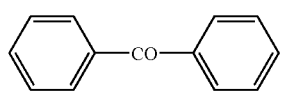

(i)

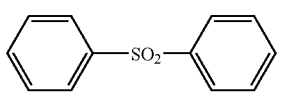

(ii)

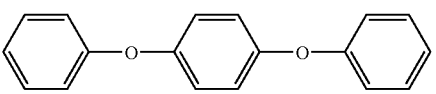

(iii)

(iv)

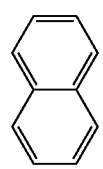

(v)

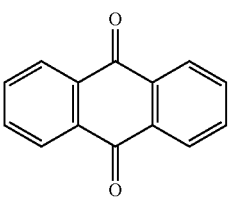

(vi)

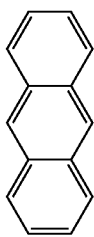

(vii)

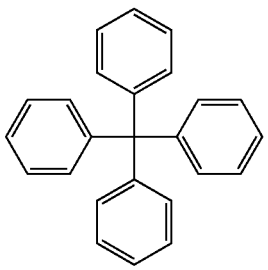

(viii)

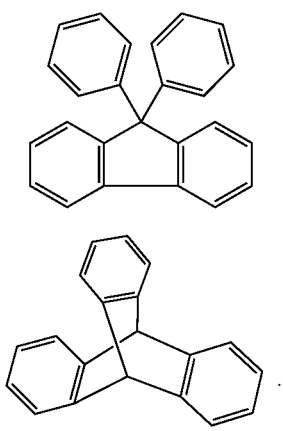

(ix)

(x)

2. A fuel cell according to claim 1, wherein the level of crystallinity in said semi-crystalline polymer is at least 5%.

3. A fuel cell according to claim 1, wherein said semi-crystalline polymer is sulphonated.

4. A fuel cell according to claim 1, wherein said semi-crystalline polymer is a copolymer comprising a first repeat unit which is selected from the following:

(a) a unit of formula IV wherein E and E' represent oxygen atoms, G represents a direct link, Ar represents a moiety of structure (iv), m and s represent zero, w represents 1 and A and B represent 1;

(b) a unit of formula IV wherein E represents an oxygen atom, E' represents a direct link, Ar represents a moiety of structure (i), m represents zero, A represents 1, B represents zero;

(c) a unit of formula V wherein E and E' represent oxygen atoms, G represents a direct link, Ar represents a moiety of structure (iv), m and v represent zero, z represents 1 and C and D represent 1;

(d) a unit of formula V wherein E represents an oxygen atom, E' represents a direct link, Ar represents a moiety of structure (ii), m represents 0, C represents 1, D represents 0;

(e) a unit of formula V wherein E and E' represents an oxygen atom, Ar represents a structure (i), m represents 0, C represents 1, z represents 1, G represents a direct link, v represents 0 and D represents 1;

(aa) a unit of formula IV wherein E represents an oxygen atom, E' represents a direct link, Ar represents a structure (i)*, m represents 0, A represents 1, B represents 0;

(bb) a unit of formula IV wherein E and E' represent oxygen atoms, Ar represents a structure (iv), m and w represent 0, G represents a direct link, s and r represent 1, A and B represent 1;

cc) a unit of formula IV wherein E and E' represent oxygen atoms, Ar represents a structure (i), m and w represent 0, G represents a direct link, s and r represent 1, A and B represent 1;

and a second repeat unit which is selected from the following:

(f) a unit of formula IV wherein E and E' represent oxygen atoms, G represents a direct link, Ar represents a moiety of structure (iv), m represents 1, w represents 1, s represents zero, A and B represent 1;

(g) a unit of formula IV wherein E represents an oxygen atom, E' is a direct link, G represents a direct link, Ar represents a moiety of structure (iv), m and s represent zero, w represents 1, A and B represent 1;

(h) a unit of formula V wherein E and E' represent oxygen atoms, G represents a direct link, Ar represents a moiety of structure (iv), m represents 1, z represents 1, v represents 0, C and D represent 1; and (i) a unit of formula V wherein E represents an oxygen atom, E' represents a direct link, G represents a direct link, Ar represents a moiety of structure (iv), m and v represent zero, z represents 1, C and D represent 1;

(j) a unit of formula IV wherein E and E' represent oxygen atoms, G represents a direct link, Ar represents a moiety of structure (v), m represents 0, w represents 1, s represents 0, A and B represent 1;

(k) a unit of formula V wherein E and E' represent oxygen atoms, G represents a direct link, Ar represents a moiety of structure (v), m represents 0, z represents 1, v represents 0, C and D represent 1;

wherein unit IV is of general formula

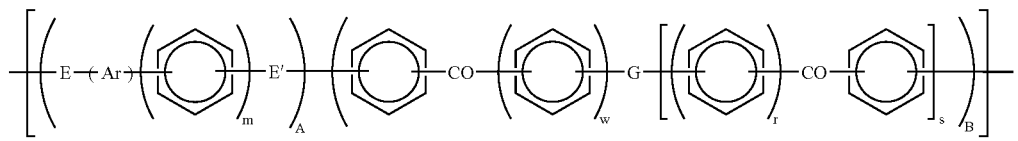

IV and
unit V is of general formula

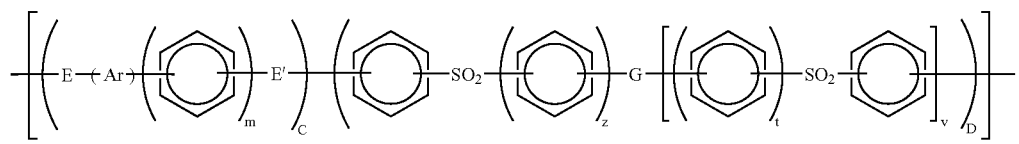

V wherein A, B, C and D independently represent 0 or 1 and E, E', G, Ar, m, r, s, t, v, w, and z are as defined in claim 1.

5. A fuel cell according to claim 1, wherein said semi-crystalline polymer is a copolymer comprising:
a first unit which includes an ion-exchange site;
a second crystalline unit; and, optionally,
a third unit which is amorphous.

6. A fuel cell according to claim 5, wherein said first unit is a repeat unit which includes aromatic group containing moieties linked by —$SO_2$— and/or —CO— and/or -Q- groups, where Q is O or S.

7. A fuel cell according to claim 5, wherein said second unit is a repeat unit which includes aromatic group containing moieties linked by —CO— and/or -Q-groups, where Q is O or S.

8. A fuel cell according to claim 5, wherein said third unit is a repeat unit which includes aromatic group containing moieties linked by —$SO_2$— and/or —CO— and/or -Q- groups, where Q is O or S provided, however, that said third unit includes a means to render it amorphous and/or not crystallisable with polyarylether ketones or polyarylthioether ketones and/or not crystallisable with said second unit.

9. A fuel cell according to claim 5, wherein first units are selected from -ether-phenyl-ketone-phenyl, -ether-phenyl-ketone-phenyl-ether-phenyl-ketone-phenyl-ketone-phenyl, -ether-biphenyl-ether-phenyl-ketone-phenyl, ether-phenyl-ether-phenyl-ketone-phenyl, ether-naphthalene-ether-phenyl-ketone-phenyl, ether-phenyl-ether-phenyl-ketone-phenyl-ketone-phenyl, -ether-dipheny-ether-phenyl-suiphone-phenyl-, -ether-phenyl-ether-phenyl-sulphone-phenyl, and ether-phenyl-suiphone-phenyl functionalised with ion-exchange sites.

10. A fuel cell according to claim 9, wherein second units are selected from ether-phenyl-ketone-pheny-ketone-phenyl-, ether-phenyl-ether-phenyl-ketone-phenyl-ketone-phenyl, -ether-phenyl-ether-phenyl-ketone-phenyl-, ether-phenyl-ketone-phenyl-, ether-phenyl-ketone-phenyl-ether-phenyl-ketone-phenyl-ketone-phenyl and ether-biphenyl-ether-phenyl-ketone-phenyl-.

11. A fuel cell according to claim 10, wherein said third units are selected from ether-phenyl-sulphone-phenyl, ether-phenyl-ether-phenyl-sulphone-phenyl and a —1,3-dioxy-4-(phenylcarbonyl) phenyl moiety derived from 2,4-dihydroxybenzophenone.

12. A plurality of fuel cells as described in claim 1.

13. A method of operating a fuel cell powered by direct fuel, wherein the fuel cell is as described in claim 1, the method comprising supplying a fuel to one side of the polymer electrolyte membrane.

14. A method of manufacturing a fuel cell powered by direct fuel as claimed in claim 1, the method comprising incorporating a semi-crystalline polymer into a polymer electrolyte membrane of the fuel cell.

15. A fuel cell according to claim 1, wherein said fuel cell is powered by methanol.

16. A method according to claim 13, wherein said fuel is a carbon-containing fuel.

17. A method according to claim 13, wherein said fuel is methanol.

* * * * *